Aug. 11, 1936.    A. F. MEYER    2,050,446
PHENOMENON INDICATING DEVICE
Filed July 8, 1929    2 Sheets-Sheet 1

INVENTOR
ADOLPH F. MEYER
BY Paul, Paul & Moore
ATTORNEYS

Aug. 11, 1936.   A. F. MEYER   2,050,446
PHENOMENON INDICATING DEVICE
Filed July 8, 1929   2 Sheets-Sheet 2

INVENTOR
ADOLPH F. MEYER
By Paul, Paul & Moore
ATTORNEYS

Patented Aug. 11, 1936

2,050,446

UNITED STATES PATENT OFFICE 2,050,446

PHENOMENON INDICATING DEVICE

Adolph F. Meyer, Minneapolis, Minn.

Application July 8, 1929, Serial No. 376,832

12 Claims. (Cl. 177—351)

This invention relates to a device more especially useful to indicate the condition of a phenomenon at a location distant therefrom.

An object of the invention is to provide, in connection with electrically charged line wires, and means joining said wires to each other and including mechanism adapted to be responsive to the movements of a phenomenon to divide the potential drop between said wires into two variables, or variable potential drops, a device of the present character designed to continuously measure the magnitudes of said variables, or variable potential drops, relatively to each other, to thus be capable of continuously indicating the condition of said phenomenon.

A further object is to provide a phenomenon-indicating device for the purpose as generally stated, and which will be of a novel and improved structure as hereinafter fully set forth, it being understood that the disclosure herein is merely illustrative and intended in no way in a limiting sense, changes in details of construction and arrangement of parts being permissible so long as within the spirit of the invention and the scope of the appended claims.

Figure 1:
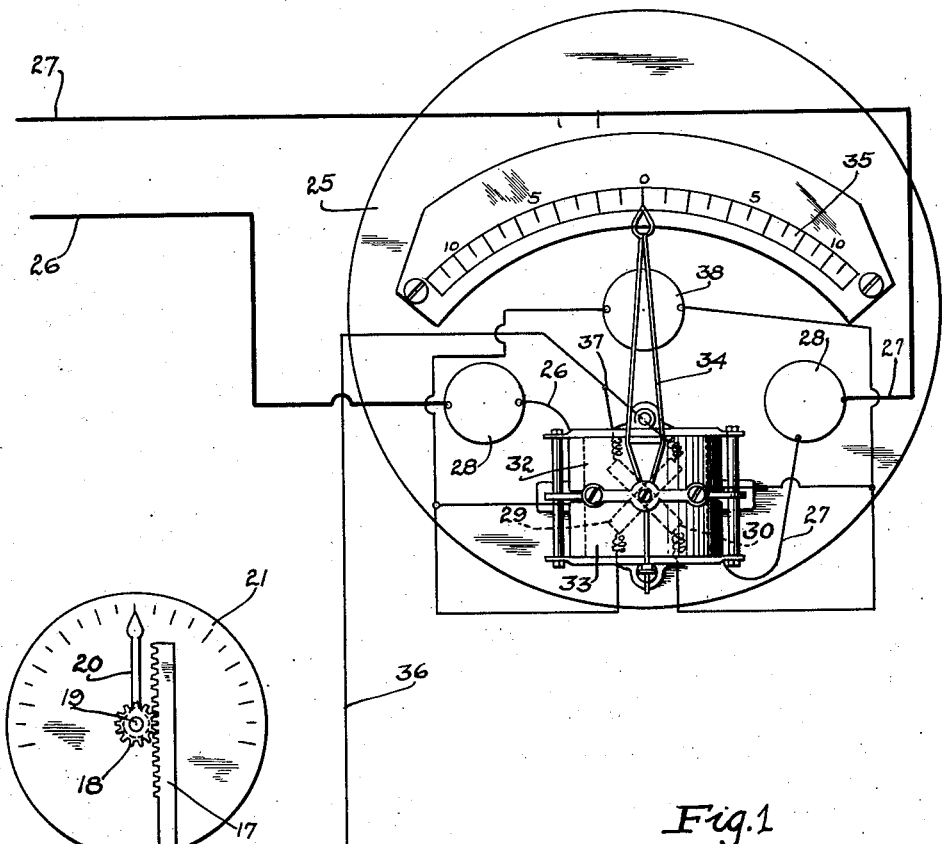
Figure 4:
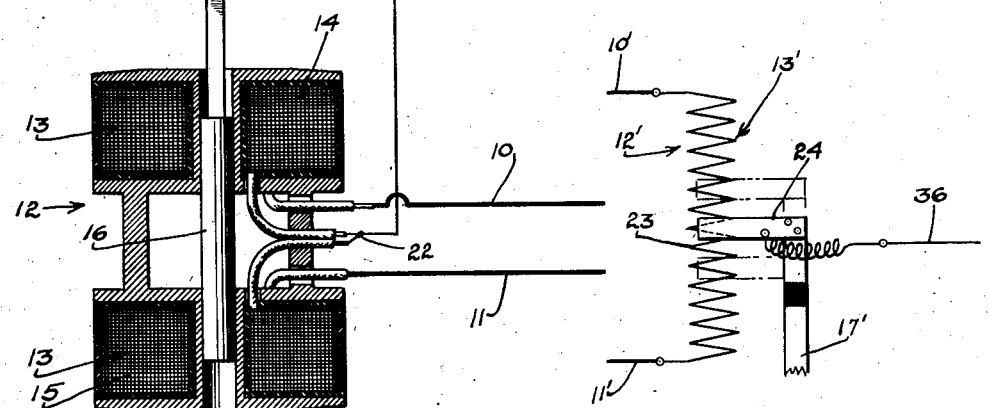
Figure 3:
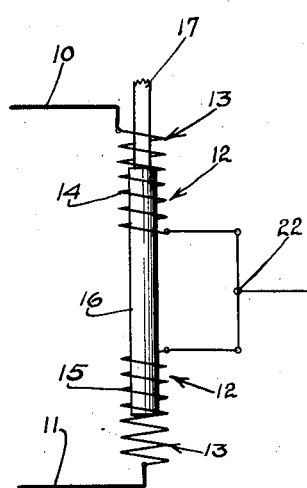
Figure 2:
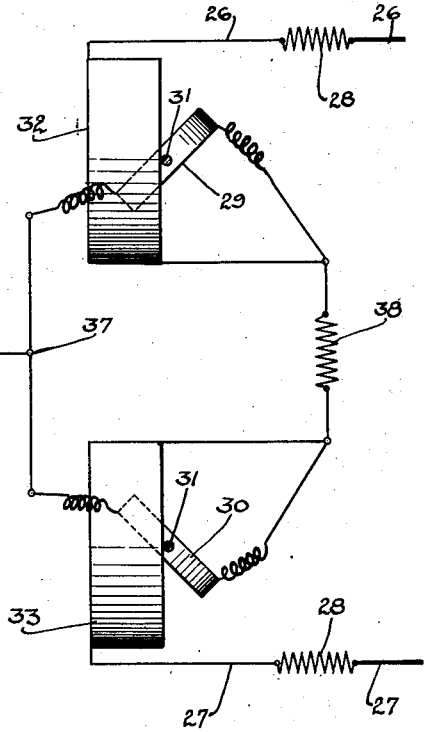
Figure 2:
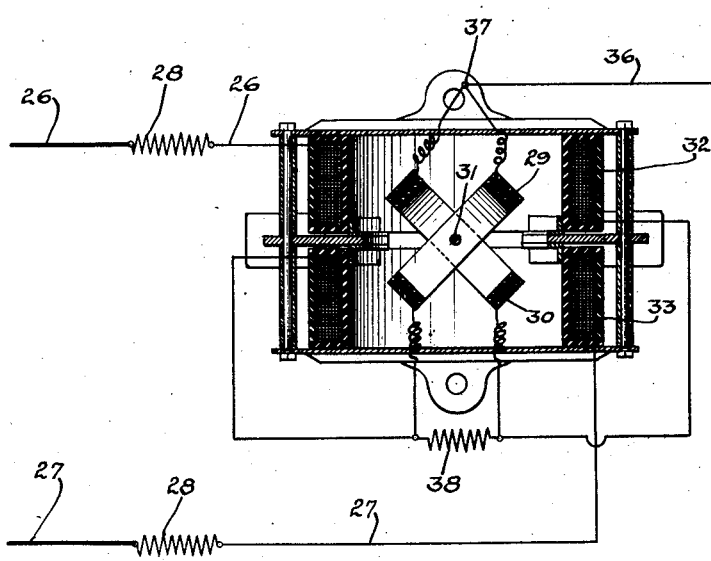
Figure 5:
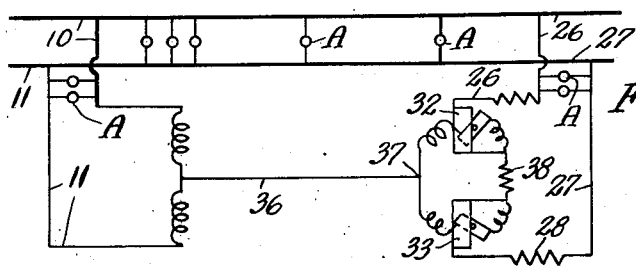

In the accompanying drawings forming a part of this specification,

Figure 1 is a plan view of a device in which the features of the invention are incorporated, also somewhat diagrammatically showing charged line wires, means connecting the wires with each other and including mechanism adapted to be responsive to the movements of a phenomenon to divide the potential drop between said wires into two variables, or variable potential drops, and an electrical conductor joining said device with said potential-drop-dividing-mechanism, and charged lead wires across which the device is connected;

Figure 2 is a detail sectional view of a portion of the device of Figure 1;

Figure 3 in a diagrammatic view of the whole disclosure of Figure 1;

Figure 4 is a view showing a modified form of mechanism for dividing the potential drop between charged line wires into two variables; and Fig. 5 is a diagrammatic view corresponding generally with the disclosure of Fig. 3, but showing a slightly different arrangement.

With respect to the drawings and the numerals of reference thereon, 10 and 11 denote charged line wires leading from any preferred source, and 12 designates, generally, means connecting the charged line wires 10 and 11 with each other, the said means 12 including mechanism 13 adapted to be responsive to the movements of a phenomenon to divide the total potential drop between the charged wires 10 and 11 into two variables, or variable potential drops. As shown in Figures 1 and 3, the mechanism 13 consists of spaced coils 14 and 15 in the means 12, and a core 16 movable in the coils. The core 16 is adapted to be responsive to any phenomenon capable of acting on it through mechanism (not shown), such for example, as a movable float, or pressure gauge, and attached to the core is a rack 17 engaging a pinion 18 on a rotatable shaft 19 carrying a pointer 20 movable over a dial 21 to continuously indicate the condition of the phenomenon. Movement of the core 16 in one direction or the other through the coils 14 and 15 will divide the potential drop between the wires 10 and 11 into two variable portions and the magnitudes of said variable portions relatively to each other will obviously determine the potential of the part of the means 12 between the coils 14 and 15, indicated 22 for the sake of convenience.

Referring to Fig. 4, a means 12' connected across charged line wires 10' and 11' is composed of a resistance element 23, and a mechanism 13', included in the means 12', adapted to be responsive to a phenomenon to divide the total potential drop into two variables or two variable potential drops, includes an L-shaped arm 24 ridable along the length of the resistance element, the arm 24 obviously being adapted to have a potential corresponding to the magnitudes of said variables, or variable portions, relatively to each other, as will be understood.

The device of the present invention is designed to continuously measure and indicate the relative magnitudes of the variables, or variable portions, into which the total potential drop between the line wires 10 and 11, or 10' and 11', may be divided by the potential-drop-dividing mechanism, to thus continuously indicate the condition of a phenomenon controlling said potential-drop-dividing mechanism.

Numeral 25 represents a dynamometer type of electrical instrument connected across lead wires, designated 26 and 27, from a source of electrical energy supply, which may be the same source as that feeding the line wires 10 and 11, or 10' and 11', or a source in synchronism and in proper phase relation with the source feeding said line wires. Resistors 28 are desirably interposed in the lead wires 26 and 27 in order to reduce the temperature effect upon certain parts (not necessary to mention) of the instrument 25.

More specifically, the instrument 25 as disclosed consists of a plurality of movable coils indicated 29 and 30 which are connected in series with each other and so fixed on a rotatable shaft 31 that when current flows through said movable coils at least one of the coils will produce a magnetic field which, when interacting with a stationary magnetic field, as, for example, a magnetic field produced by the stationary coils 32 and 33, connected across the lead wires 26 and 27, will tend to rotate the shaft 31 in one direction, while at least one of the movable coils will produce a magnetic field which, when interacting with a stationary magnetic field, such as supplied by the stationary coils 32 and 33, will tend to rotate said shaft in the opposite direction.

A pointer 34 fixed upon the shaft 31 is adapted to move over a dial 35.

In addition to producing a stationary magnetic field, the stationary coils 32 and 33 provide a certain amount of resistance to the flow of current through them. The finer the wire employed in the stationary coils 32 and 33, the greater the resistance offered by these coils, the greater the temperature effect, and the less resistance required in the resistors 28, and vice versa. The obvious purpose of the resistance values of stationary coils 32 and 33 and resistances 28 is to limit the current in the moving coils 29 and 30 to a practicable amount, and thereby limit the temperature effect.

An electrical conductor 36 connects the movable coils 29 and 30 to the potential-drop-dividing mechanism 13, or 13', said conductor attaching to the movable coils at the common terminal, indicated 37 for convenience, between said movable coils, and to said mechanism 13 at the point 22; or to the mechanism 13' at the arm 24.

The manner in which the device operates will now be described. Assume that the phenomenon has moved the plunger 16 into such a position that the potential drops between the charged line wires 10 and 11 and the point 22 are equal, and that the resistances, stationary and movable coils of the instrument 25 are, respectively, similar, then the potential of the point 22 will be equal to the potential of the point 37, no current will flow through the conductor 36 and equal currents will flow through the movable coils 29 and 30, and the pointer 34, if designed to make equal angles with the two movable coils, will assume the zero position shown in Figure 1. Assume next, that the phenomenon has moved the plunger 16 into a new position, causing unequal potential drops from the line wires 10 and 11 to the point 22, and therefore, a difference in potential between the points 22 and 37, causing current to flow through the conductor 36 either between the line wire 10 and the lead wire 27, or between the line wire 11 and the lead wire 26, as the case may be. This will alter the flow of current through the movable coils 29 and 30, causing them to take a new position. The whole arrangement of the device is such that a change in the value of the variables, or variable potential drops, relatively to each other, as made by the mechanism 13, or 13', responsive to the action of the phenomenon, imparts a predetermined amount of rotative movement to the shaft 31 to turn the pointer 34 a predetermined distance along the scale of the dial 35 to indicate the relative magnitudes of the variables, or variable potential drops, to thus continuously indicate the condition of the phenomenon, as will be evident.

The larger the amount of current flowing in a movable coil, 29 or 30, other things equal, the stronger the magnetic field produced and the greater the tendency of that coil to line itself up parallel with the stationary coils, 32 and 33. However, the parallel position into which the moving coil tends to move, is a relatively disadvantageous one. When a movable coil stands at right angles with a stationary coil, it is in the most advantageous position, and a small amount of current will produce a relatively large torque, which may be equal to the torque produced by a large amount of current when the same coil is nearly parallel with the stationary coil. When the current in one movable coil increases, the coil moves into a less advantageous position, and if at the same time the current in the other movable coil decreases, it will move into a more advantageous position. When the two coils are acting on the same shaft, as shown, they will rotate the shaft until the coils have taken a position, relative to the stationary coils, in which the torques are equal. As the current in the coil which has the largest current flowing through it reduces this coil moves into a more advantageous position, whereas, as the current in the coil which has the least current flowing through it increases that coil moves into a less advantageous position. Obviously, equilibrium will be established and the pointer will take a position in which the torques exerted upon the rotatable shaft 31 by the movable coils 29 and 30 are equal. It follows that when equal currents are flowing in the movable coils 29 and 30 arranged as described, said coils will assume equal angles with the stationary coils, and as shown the pointer 34 is attached to the rotatable shaft to which the moving coils are secured so that it bisects the angle between them, in order that under those conditions the pointer will assume the zero position shown in Figure 1. It will be evident that the position of the pointer is substantially determined by the ratio of the currents flowing in the movable coils 29 and 30.

As so far described, a change in the value of the variables, or variable potential drops, as accomplished by the mechanism responsive to the action of a phenomenon to divide the total potential drop between the line wires 10 and 11 into variables will be sufficient to alter the amounts of current flowing in the movable coils 29 and 30 to an extent to move the pointer 34, but the distance through which said pointer moves, for any given change in potential drops, depends substantially upon the resulting change in ratio of the currents flowing in the movable coils. To control this resulting change in the ratio of the currents flowing in the movable coils, in response to a change in the value of the variables, or variable potential drops, and to thus make provision for a movement of the pointer through a desired arc, I provide a resistance element or by-pass, such as indicated at 38, connected in parallel with the movable coils 29 and 30. The larger the resistance or impedance of the element 38, the more will be the travel required of the core 16, or of the arm 24, for full scale deflection of the pointer 34.

The resistant element or by-pass 38, and the two movable coils 29 and 30 are, as shown, placed in parallel between the two stationary coils, or they may be placed, with proper resistances, directly between the lead wires 26 and 27. A substantial resistance value is required either in the stationary coils 32 and 33, or in the resistances

28, or other resistance means directly connected to the lead wires 26 and 27 for that purpose.

It will be apparent that the function of the resistance element or by-pass 38 is to control the total amount of current allowed to flow through the movable coils 29 and 30. Were no resistance element or by-pass 38 employed, the amount of current flowing through said movable coils 29 and 30 would be a maximum. The interposition of the element 38 as a by-pass in parallel with the movable coils will necessarily reduce the amount of current flowing through the movable coils. In an instance where no resistance element or by-pass 38 is employed, the amount of excess current in one of the movable coils relatively to the current flowing in the other movable coil, caused by a change in the value of the variables, or variable potential drops, in the manner as described, would be relatively small compared to the total amount of current flowing through said movable coils, and would, as a result, cause the pointer to be deflected but a relatively small amount, for the reason, as before stated, that the instrument substantially measures the ratio of the currents flowing in the movable coils, whereas when an element 38 is employed to reduce the amount of current flowing through the movable coils, the amount of excess current caused to flow in the manner as stated will be relatively larger compared to the total amount. Therefore, by employing an element or by-pass 38 having selected resistance or impedance value, the amount of excess current made to flow in one of the movable coils relatively to the current flowing in the other movable coil, caused by change in the value of the variables, or variable potential drops, can have any desired relation to the total amount of current flowing through the movable coils, so that the ratio of the currents flowing in the two movable coils can be any preferred ratio for any given position of the plunger 16, or of the arm 24, thus to effect deflection of the pointer 34 through an arc of a magnitude which shall have been previously determined.

It will be apparent that in the form of the invention as shown in Figures 1 and 3, the current utilized at the line wires 10 and 11 and at the lead wires 26 and 27 will be alternating current, while in the form of the invention of Figure 4, the line wires and lead wires may carry direct current. In either event, the line wires and lead wires may emanate from the same source, such a condition being contemplated by the statement, hereinbefore in effect made, that the line wires and the lead wires are charged with current from sources having similar electrical characteristics.

In Fig. 5, numerals 10, 26 and 11, 27 denote charged line wires leading from a source or sources, said line wires 10, 26 and 11, 27 being the equivalent of the similar line wires in Fig. 3, but the line wires 10 and 26 and 11 and 27, respectively, being shown connected. The remainder of the disclosure of Fig. 5 agrees with the disclosure of Fig. 3, except that lamps A, or other current-using devices, are shown connected across the line wires 10 and 11 and 26 and 27, respectively.

I claim as my invention:

1. The combination with charged line wires and means connecting said charged line wires with each other including actuatable mechanism for dividing the potential drop between the charged line wires into two variables, of opposed movable coils conductively situated between two stationary coils and connected in series therewith across said line wires, said movable coils being in the magnetic field of said stationary coils, and a conductor connecting the common terminal of said movable coils to said potential drop dividing mechanism, for measuring the magnitudes of said variables relatively to each other.

2. The combination with charged line wires and means connecting said charged line wires with each other including actuatable mechanism for dividing the potential drop between the charged line wires into two variables, of opposed movable coils conductively situated between two stationary coils and connected in series therewith across said line wires, said movable coils being in the magnetic field of said stationary coils, a conductor connecting the common terminal of said movable coils to said potential drop dividing mechanism, and a by-pass element connected in parallel with said movable coils and adapted to control the ratio of the currents flowing in the movable coils corresponding to any given potential variables, for measuring the magnitude of said variables relatively to each other.

3. The combination as specified in claim 2, wherein said by-pass element is a resistance member.

4. The combination as specified in claim 2, wherein said by-pass element is an impedance member.

5. The combination with charged line wires and means connecting said charged line wires with each other including actuatable mechanism for dividing the potential drop between the charged line wires into two variables, of a stationary magnetic field, opposed movable coils in said magnetic field and conductively situated between two resistances and connected in series therewith across said line wires, a conductor connecting the common terminal of said movable coils to said potential drop dividing mechanism, and a by-pass element connected in parallel with said movable coils and adapted to control the ratio of the currents flowing in the movable coils corresponding to any given potential variables, for measuring the magnitude of said variables relatively to each other.

6. The combination with charged line wires and means connecting said charged line wires with each other including actuatable mechanism for dividing the potential drop between the charged line wires into two variables, of opposed movable coils conductively situated between two stationary coils and between two resistances and connected in series therewith across said line wires, said movable coils being in the magnetic field of said stationary coils, and a conductor connecting the common terminal of said movable coils to said potential drop dividing mechanism, for measuring the magnitudes of said variables relatively to each other.

7. The combination with charged line wires and means connecting said charged line wires with each other including actuatable mechanism for dividing the potential drop between the charged line wires into two variables, of opposed movable coils conductively situated between two stationary coils and between two resistances and connected in series therewith across said line wires, said movable coils being in the magnetic field of said stationary coils, a conductor connecting the common terminal of said movable coils to said potential drop dividing mechanism, and a by-pass element connected in parallel with said movable coils and adjustable to control the ratio of the currents flowing in the movable coils corresponding to any given potential variables, for measuring the magnitude of said variables relatively to each other.

8. The combination with charged line wires and means connecting said charged line wires with each other including actuatable mechanism for dividing the potential drop between the charged line wires into two variables, of opposed movable coils conductively situated between two stationary coils and connected in series therewith across said line wires, said movable coils being in the magnetic field of said stationary coils, a common support for said movable coils, a conductor connecting the common terminal of said movable coils to said potential drop dividing mechanism, and a by-pass element connected in parallel with said movable coils and adapted to control the ratio of the currents flowing in the movable coils corresponding to any given potential variables, for measuring the magnitude of said variables relatively to each other.

9. The combination with charged line wires and means connecting said charged line wires with each other including actuatable mechanism for dividing the potential drop between the charged line wires into two variables, of a stationary magnetic field, opposed movable coils conductively situated between two resistances and connected in series therewith across said line wires, said movable coils being in said stationary magnetic field, a common support for said movable coils, an indicator actuatable by motion of said movable coils, a conductor connecting the common terminal of said movable coils to said potential drop dividing mechanism, and a resistance or impedance element connected in parallel with said movable coils and adapted to control the ratio of the currents flowing in the movable coils corresponding to any given potential variables, for measuring the magnitude of said variables relatively to each other.

10. In a bridge circuit, the combination of a pair of line wires connected to a source of current, variable means comprising a potential divider connected between said line wires for dividing the potential drop between them into two variables, a stationary magnetic field, a pair of rotor coils associated with said stationary magnetic field, means for mounting said rotor coils to rotate in said stationary magnetic field, means mechanically connecting the rotor coils in opposed torque relation, a common indicating element connected to said rotor coils, a plurality of leads connecting each rotor coil to a common point and in series with a resistance to a respective line wire, a connection from the common point to an intermediate point of the potential divider, and a by-pass element connected in parallel with said rotor coils to control the ratio of currents flowing in said coils in response to variations in the potential cariables due to adjustment of the potential divider to thereby measure the relative magnitudes of said variables.

11. In a bridge circuit, the combination of a pair of line wires connected to a source of current, variable means comprising a potential divider connected between said line wires for dividing the potential drop between them into two variables, a pair of stators comprising field coils, a rotor coil associated with each field coil, means for mounting each rotor coil to rotate in the field of its stator, means mechanically connecting the rotor coils in opposed torque relation, a common indicating element connected to said rotor coils, a plurality of leads connecting each rotor coil to a common point and in series with its field coil to a respective line wire, a connection from the common point to an intermediate point of the potential divider, and a by-pass element connected in parallel with said rotor coils to control the ratio of currents flowing in said coils in response to variations in the potential variables due to adjustment of the potential divider to thereby measure the relative magnitudes of said variables.

12. The combination with charged line wires and means connecting said charged line wires with each other including actuatable mechanism for dividing the potential drop between the charged line wires into two variables, of a stationary magnetic field, opposed movable coils in said magnetic field and conductively situated between means having substantial resistance value and connected in series therewith across said line wires, a conductor connecting the common terminal of said movable coils to said potential drop dividing mechanism, and a by-pass element connected in parallel with said movable coils and adapted to control the ratio of the current flowing in the movable coils corresponding to any given potential variables, for measuring the magnitude of said variables relatively to each other.

ADOLPH F. MEYER.